US007664464B2

(12) United States Patent
Gerstenkorn

(10) Patent No.: US 7,664,464 B2
(45) Date of Patent: Feb. 16, 2010

(54) METHOD FOR THE EXCHANGE OF DATA

(75) Inventor: Bernhard Gerstenkorn, Ebikon (CH)

(73) Assignee: Inventio AG, Hergiswil NW (CH)

(*) Notice: Subject to any disclaimer, the term of this patent is extended or adjusted under 35 U.S.C. 154(b) by 447 days.

(21) Appl. No.: 11/459,987

(22) Filed: Jul. 26, 2006

(65) Prior Publication Data

US 2007/0026801 A1 Feb. 1, 2007

(30) Foreign Application Priority Data

Jul. 28, 2005 (EP) .................................. 05106987

(51) Int. Cl.
*H04B 7/00* (2006.01)

(52) U.S. Cl. ...................... 455/41.2; 187/380; 187/382; 187/392

(58) Field of Classification Search ................ 455/41.2; 187/380, 382, 392
See application file for complete search history.

(56) References Cited

U.S. PATENT DOCUMENTS

| | | | | |
|---|---|---|---|---|
| 6,382,363 | B1 * | 5/2002 | Friedli | 187/384 |
| 2001/0002635 | A1 * | 6/2001 | Yamakawa | 187/296 |
| 2002/0146999 | A1 * | 10/2002 | Witte | 455/345 |
| 2002/0178385 | A1 * | 11/2002 | Dent et al. | 713/202 |
| 2002/0180582 | A1 * | 12/2002 | Nielsen | 340/5.6 |
| 2003/0034877 | A1 | 2/2003 | Miller et al. | |
| 2003/0159890 | A1 | 8/2003 | Schuster et al. | |
| 2003/0194089 | A1 | 10/2003 | Kansala et al. | |
| 2004/0046640 | A1 | 3/2004 | Jourdain et al. | |

FOREIGN PATENT DOCUMENTS

| | | | |
|---|---|---|---|
| CN | 1427799 | A | 7/2003 |
| DE | 102 19 852 | A1 | 3/2003 |
| DE | 103 06 023 | A1 | 9/2004 |
| EP | 1 065 641 | A1 | 1/2001 |

(Continued)

OTHER PUBLICATIONS

XP-001506205; May 2002; Passive Keyless Entry From Microchip; Automotive Engineering, 20020501 Society of Automotive Engineers; Warrendale, US—ISSN 0098-2571; vol. 110, Nr: 5, pp. 80/81.

*Primary Examiner*—Patrick N Edouard
*Assistant Examiner*—Shantell Heiber
(74) *Attorney, Agent, or Firm*—Fraser Clemens Martin & Miller LLC; William J. Clemens

(57) ABSTRACT

A method for exchange of data between a mobile communications unit carried by a user and at least one of a first communications unit, a second communications unit and a computer unit positioned at different locations in an environment such as a building. When the first communications unit and the mobile communications unit are spaced at a predetermined distance, a near-field radio connection is generated within this distance. After data exchange between the mobile communications unit and the first communications unit, the data are communicated by the first communications unit to the computer unit. When the second communications unit and the mobile communications unit are spaced from one another at the predetermined distance, a near-field radio connection is generated within this distance. A data exchange takes place between the mobile communications unit and the second communications unit by the near-field radio connection.

31 Claims, 1 Drawing Sheet

FOREIGN PATENT DOCUMENTS

| | | | |
|---|---|---|---|
| EP | 1 189 306 | A1 | 3/2002 |
| EP | 1 216 900 | A1 | 6/2002 |
| EP | 1 443 471 | A2 | 8/2004 |
| EP | 1 443 471 | A3 | 8/2004 |
| WO | WO 00/77329 | A2 | 12/2000 |
| WO | WO 03/100732 | A1 | 12/2003 |
| WO | WO 2004/006064 | A2 | 1/2004 |

* cited by examiner

METHOD FOR THE EXCHANGE OF DATA

BACKGROUND OF THE INVENTION

The invention relates to a method for the exchange of data between a mobile communications unit carried by a user and at least one first communications unit, a second communications unit and a computer unit.

Electronic door locks are used in modern hotel complexes for access to the rooms. For reasons of cost these electronic door locks are not wired and are operated with batteries for energy supply. Two methods are known for distribution of locked access codes to all electronic door locks and for collation of data from all electronic door locks, for example battery charge state and who has access when.

In a first method all door locks are equipped with infrared interfaces. However, the disadvantage exists with systems of that kind in that data collectors with infrared interfaces, which exchange the data with the door locks, have to be installed in the hotel corridors at the ceilings at various locations. On the other hand, the data collectors are connected with a central computer unit by way of a wire connection in order to exchange the data to and from the electronic door locks. In a second method the data exchange with a central computer unit is to thereby make it possible for, for example, room cleaning personnel to be equipped with a smartcard. After the person has inserted the smartcard into an electronic door lock, access to the room is freed after successful checking of an access code filed on the smartcard. At the same time the locked access codes are transferred from the smartcard to the electronic door lock and access data from the electronic door lock to the smartcard. However, the disadvantage exists with systems of that kind in that a smartcard of that kind usually has to be inserted at a validation station linked with a central computer unit in order to transfer data from the smartcard to the management system or to a central data bank and conversely.

SUMMARY OF THE INVENTION

The present invention has the object of so developing a method for the exchange of data that the user has to perform less actions by comparison with conventional methods and no additional data collectors or validation stations have to be installed so that the data exchange can be managed.

According to the present invention for fulfillment of this object in the case of a method for the exchange of data between a mobile communications unit carried by a user and at least one first communications unit, a second communications unit and a computer unit, wherein the first communications unit, the second communications unit and the computer unit are positioned at different locations in an environment, particularly in a building, it is provided that the method comprises the following steps:

a) establishing contact between the mobile communications unit and the first communications unit when the first communications unit and the mobile communications unit are spaced from one another at a predetermined distance, wherein a near-field radio connection is generated within this distance;

b) exchange of data between the mobile communications unit and the first communications unit by means of the near-field radio connection;

c) communication of data from the first communications unit to the computer unit standing in connection with the first communications unit;

d) establishing contact between the mobile communications unit and the second communications unit, which differs from the first communications unit, when the second communications unit and the mobile communications unit are spaced from one another at the predetermined distance, wherein a near-field radio connection is generated within this distance; and e) exchange of data between the mobile communications unit and the second communications unit by means of the near-field radio connection.

An environment is a location where numerous people come together, such as, for example, a building, a factory area, a high-rise structure, a shopping center, a town district, a leisure park, a railway station, an airport, a swimming pool or a sports stadium.

The method according to the present invention is based on the recognition that the data exchange with the central computer unit can take place on the one hand by way of a plurality of communications units, for example by the first communications unit. On the other hand, the data exchange can take place by means of a near-field communications system via a radio connection, whereby the user can move freely in the environment, the mobile communications unit acts as temporary data store and there is little to even no requirement for actions by the user in order to manage the intended data exchange.

There is provided by the present invention a method which is used preferably for a building with at least one elevator and a number of destination call terminals, which are distributed on the respective floors, as the first communications unit and a plurality of electronic door locks as the second communications unit. The NFC standard is preferably provided as the data transmission standard for the near-field radio connection. This means that the data exchange between the respective units is possible only within a near field. In this manner it can additionally be ensured that no unauthorized access to the data takes place and thus, for example, spying on access codes.

In an advantageous development of the method it is provided that in the case of the exchange of data between the mobile communications unit and the first communications unit a first localization code describing the location of the first communications unit is communicated by the first communications unit to the mobile communications unit. In this connection it can equally be provided that a second localization code describing the location of the second communications unit can be communicated by the second communications unit to the mobile communications unit. It can be established on the basis of the localization codes and the associated points in time of the communication when a specific region, particularly a room, was entered and/or left. For the case that apart from the localization code an identification code is additionally communicated it can also be determined which user has entered or left the region.

In a development of the method according to the invention it is proposed that an access authorization of the user is checked in step b) or e) before the exchange of the data and the data are exchanged only when the check of the access authorization is successful. It can be ensured by this measure that only persons with access authorization obtain data and items of information, particularly access codes.

In a development of the method according to the present invention it is proposed that data, for example a list of locked access codes, are distributed by the computer unit to all first communications units before step b) and these data are stored in the first communications unit.

In a development of the method according to the present invention it is proposed that in step b) the data, for example a list of locked access codes, stored in the first communications unit are transferred to the mobile communications unit and these data are temporarily stored in the mobile communications unit and in step e) are transferred to the second communications unit and stored in the electronic door lock. In this manner locked access codes can be distributed very efficiently to all electronic door locks and locked access codes can be recognized in the evaluation of the access authorization.

In a development of the method according to the present invention it is proposed that the data transferred in step e) from the second communications unit in the electronic door lock to the mobile communications unit, insofar as the mobile communications unit at this point time has still established a short-distance radio connection, for example Bluetooth, with the first communications unit, are directly passed on by means of short-distance radio connection to the first communications unit and this passes on the data to the computer unit.

In a development of the method according to the present invention it is proposed that in step b) additional communications parameters, by which the mobile communications unit in step e) can produce a communications connection by way of a local mobile radio operator to the computer unit, are transferred to the mobile communications unit so that the data transferred by the second communications unit in the electronic door lock to the mobile communications unit can be passed on directly to the computer unit.

In a development of the method according to the present invention it is proposed that the data transferred in step e) by the second communications unit in the electronic door lock to the mobile communications unit are intermediately stored in the mobile communications unit and only when the mobile communications unit at a later point in time has again established a near-field radio connection with the first communications unit are the intermediately stored data then communicated via this first communications unit to the computer unit.

According to a preferred development of the method according to the present invention an access code is communicated in the exchange of the data in step b) or e). In this connection it can be provided that the mobile communications unit communicates the access code to the first communications unit or the second communications unit. The user can in case of need communicate an access code, which is already filed in the mobile communications unit, automatically or by manual operation of a keyboard or by a speech input. According to a preferred development of the method the data are communicated by at least one of the communications units to the computer unit only at specific points in time or in a specific time period. This makes it possible to initially collect the data and to communicate the data only from a specific amount of data. Equally, it can be provided that the data are communicated by the computer unit to at least one communications unit only at specific points in time or within a specific time period.

It is further of advantage if the data are exchanged in dependence on the access authorization. Thus, different data can be transmitted in accordance with the respective level of access authorization.

In a further preferred development of the method it is provided that the data are selected by means of the mobile communications unit. In this manner the user can prohibit communication of specific items of information or call up only the items of information useful for the respective purpose.

A mobile telephone, a PDA (Personal Digital Assistant) or a watch is preferably used as the mobile communications unit. It is thus possible to avoid an obligation on the user to carry, for example, apart from his or her mobile telephone a further mobile communications unit. The first communications unit is preferably an elevator terminal. Preferably a plurality of elevator terminals is distributed in the region of the elevator installation on the respective floors. The second communications unit preferably controls an electronic door lock.

The range of the near field is preferably less than approximately 10 meters. This means that the establishing of contact between the mobile communications unit and the first communications unit or the second communications unit only comes into being when the units intended for the data exchange are at a spacing of less than approximately 10 meters. In this connection it is particularly advantageous that, in particular, the Bluetooth standard can be used as transfer standard for data transfer within such a distance.

DESCRIPTION OF THE DRAWINGS

The above, as well as other, advantages of the present invention will become readily apparent to those skilled in the art from the following detailed description of a preferred embodiment when considered in the light of the accompanying drawings in which.

DESCRIPTION OF THE PREFERRED EMBODIMENT

Figure 1:
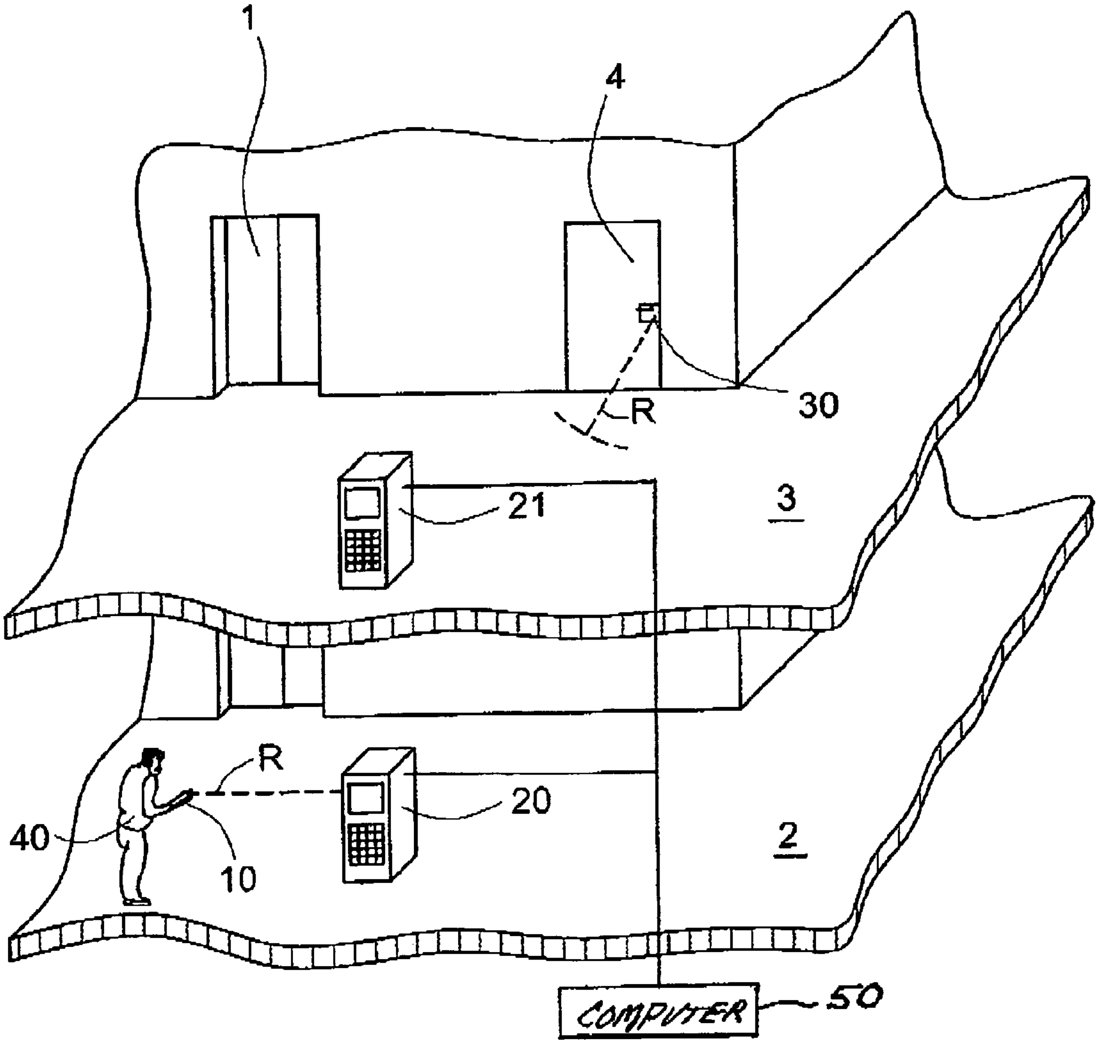
FIG. 1 is a schematic perspective view of two floors of a building with a system for the guidance of an elevator user according to the present invention.

FIG. 1 shows schematically a detail of a building with a system for the exchange of data, wherein the system additionally serves for guidance of a user 40 in the building and for access control to an elevator 1 and to a room closed by a door 4. The system provides the elevator 1 by which the user 40 can be transported from a first floor 2 to a second floor 3. In addition, a first terminal 20 is disposed in the vicinity of the elevator 1 in the first floor 2 and a second terminal 21 is disposed in the vicinity of the elevator 1 in the second floor 3. Terminals 20 and 21 respectively form a first communications unit and are connected with a computer unit 50. In order to grant access to the elevator 1 as well as to the room closed by the door 4 the user 40 carries a mobile telephone 10 which forms a mobile communications unit. The door 4 is equipped with a transmitter/receiver unit 30 that forms a second communications unit. The mobile telephone 10 has a memory unit, an interface, a display and a keyboard.

A method for exchange of data by means of the aforesaid communications unit 10, 20, 21 and 30 in the building is explained in the following on the basis of this system. After the user 40 has entered the building at the floor 2 he or she approaches the elevator 1. As soon as the user 40 is standing in the vicinity of the terminal 20, for example at a distance of less than approximately ten meters, establishing of contact between the mobile telephone 10 and the terminal 20 takes place. For this purpose the terminal 20 permanently emits a contact signal within a distance R, i.e. in the region of less than approximately ten meters. As soon as the user 40 with the mobile telephone is located within the distance R from the terminal 20 and receives the contact signal the contact comes into being.

Based on this establishing of contact, data are thereupon exchanged between the mobile telephone 10 and the terminal 20 by way of a near-field communications system with use of the NFC standard. In that case, for example, a localization code describing the location of the terminal 20 is transmitted, as data, by the terminal 20 to the mobile telephone 10. After receipt of the localization code the mobile telephone 10 automatically checks whether it can assign to this localization code a corresponding code filed in the memory unit of the mobile telephone 10. If this check is successful, the mobile telephone 10 transmits a first access code, which enables access to the elevator 1, to the terminal 20. The terminal 20 thereupon checks whether the access code transmitted by the mobile telephone 10 agrees with an original access code filed in the terminal 20 or in the central computer unit and in the case of agreement frees access to the elevator 1 and transmits a list with locked access codes for temporary storage at the mobile telephone 10.

After the user 40 has been transported by the elevator 1 from the first floor 2 to the second floor 3 and has left the elevator 1 at the second floor 3, establishing of contact between the terminal 21 and the mobile telephone 10 comes about in the same manner as between the terminal 20 and the mobile telephone 10, particularly under the precondition that the user 40 is located within the distance R of the near field generated by the terminal 1. In the case of the data exchange, which follows thereupon, between the terminal 21 and the mobile telephone 10 there is transmission to the mobile telephone 10 of data containing information enabling guidance of the user 40 to the destination, i.e. to the closed room. With help of this information, which the user 40 can read off the display of the mobile telephone 10, the user 40 moves in direction towards the door 4.

As soon as the user 40 is at a spacing of, for example, approximately 2 meters from the door 4 the transmitter/receiver unit 30 forming the second communications unit establishes contact with the mobile telephone 10. This happens in the same manner as the afore-described establishing of contact of the mobile telephone 10 with the terminal 20 or with the terminal 21 by means of a near-field radio connection. In the case of the subsequent data exchange between the transmitter/receiver unit 30 and the mobile telephone 10 the mobile telephone 10 transmits a second access code, which serves for release of the electronic door lock of the door 4, to the transmitter/receiver unit 30 and the list, which is temporarily stored on the mobile telephone, with locked access codes. The transmitter/receiver unit 30 subsequently checks the communicated second access code with the original access code, which is filed in the electronic door lock, and the list of locked access codes and in the case of agreement releases the electronic door lock and thus the door 4. The user 40 can now enter the room.

However, apart from the second access code also further data such as, for example, a personal identification code, the instant of entry and the instant of departure of the room are communicated. The transmitter/receiver unit 30 is in that case equipped in such a manner that it stores over a predetermined period of time all data, which was communicated by the mobile telephone 10, in a memory unit and/or transmits the stored access data as a packet to the mobile telephone 10, which temporarily stores this data.

The afore-described method is distinguished particularly by the fact that the terminals 20, 21 serve as data collecting stations. In this manner the user does not have to carry, as previously usual, a passive data storage unit and, so to say, transport as transport medium the data to a validation station. Thus, it is possible to dispense with conventional smartcards or other separate chipcards that are carried. In particular, if the mobile telephone 10 is equipped so that the afore-described establishing of contact and data exchange processes can take place automatically, a user-friendly system can be provided.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for the exchange of data between a mobile communications unit carried by a user and at least one of an elevator terminal, a transmitter/receiver unit and a computer unit, wherein the elevator terminal, the transmitter/receiver unit and the computer unit are positioned at different locations in an environment, wherein the elevator terminal frees access to an elevator and the transmitter/receiver releases an electronic door lock of a door; wherein the method comprises the following steps:

a) establishing contact between the mobile communications unit and a first elevator terminal disposed in the vicinity of the elevator at a first floor when the first elevator terminal and the mobile communications unit are spaced from one another at a predetermined distance, wherein a near-field radio connection is generated within the distance;

b) exchange of data between the mobile communications unit and the first elevator terminal by the near-field radio connection, whereby a list with locked access codes stored in the first elevator terminal is transferred from the first elevator terminal to the mobile communications unit and is temporarily stored in the mobile communications unit;

c) communication of data from the first elevator terminal to the computer unit, which computer unit is connected with the first elevator terminal;

d) establishing contact between the mobile communications unit and the transmitter/receiver unit when the transmitter/receiver unit and the mobile communications unit are spaced from one another at the distance, wherein a near-field radio connection is generated within the distance; and e) exchange of data between the mobile communications unit and the transmitter/receiver unit by the near-field radio connection, whereby the list with locked access codes temporarily stored in the mobile communications unit is transferred by the mobile communications unit to the transmitter/receiver unit and stored in the electronic door lock.

2. The method according to claim 1, wherein before said step b), the list of locked access codes is distributed by the computer unit to all elevator terminals associated with the elevator including the first elevator terminal and the list is stored in the elevator terminals.

3. The method according to claim 1, wherein a first localization code describing a location of the first elevator terminal is communicated by the first elevator terminal to the mobile communications unit in said step b).

4. The method according to claim 3, wherein after receipt of the localization code in said step b), the mobile communications device automatically checks whether it can assign to this localization code a corresponding code stored in a memory of the mobile communications unit; and if this check is successful, a first access code is transmitted by the mobile communications unit to the first elevator terminal.

5. The method according to claim 3, wherein a second localization code describing the location of the transmitter/ receiver unit is communicated by the transmitter/receiver unit to the mobile communications unit in said step e).

6. The method according to claim 5, wherein after receipt of the second localization code in said step e), the mobile communications device automatically checks whether it can assign to the second localization code a corresponding code stored in a memory of the mobile communications unit; and if this check is successful, a second access code is transmitted by the mobile communications unit to the transmitter/receiver unit.

7. The method according to claim 1, wherein an access code which is already stored in the mobile communications unit is communicated from the mobile communications unit by one of: automatically, manual operation of a keyboard or by a speech input.

8. The method according to claim 7, wherein the first elevator terminal thereupon checks whether the access code transmitted by the mobile communications unit agrees with an original access code stored in the first elevator terminal or in the computer unit, and in the case of agreement, the first elevator terminal frees access to the elevator.

9. The method according to claim 8, wherein after the access to the elevator has been freed by the first elevator terminal, the user is transported by the elevator from the first floor to a second floor.

10. The method according to claim 9, wherein after the user has left the elevator at said second floor, a contact between a second elevator terminal disposed in a vicinity of the elevator at the second floor and the mobile communications unit is established when the mobile communications unit and the second elevator terminal are spaced from one another at a predetermined distance, wherein a near-field radio connection is generated within this distance, data are exchanged between the mobile communications unit and the second elevator terminal by the near-field radio connection, whereby data that contains information enabling guidance at the user to a destination is transferred from the second elevator terminal to the mobile communications unit.

11. The method according to claim 10, wherein using the information transferred from the second elevator terminal to the mobile communications unit, which the user can read off a display of the mobile communications unit, the user moves towards the destination being a door of a closed room.

12. The method according to claim 7, wherein the second elevator terminal thereupon checks whether the access code transmitted by the mobile communications unit agrees with an original access code stored in the second elevator terminal or in the computer unit; and in the case of agreement, the second elevator terminal transmits the list with locked access codes for temporary storage to the mobile communications unit.

13. The method according to claim 1, wherein in said step e), a second access code is transmitted by the mobile communications unit to the transmitter/receiver unit, which second access code enables release of the electronic door lock of the door, the transmitter/receiver unit checks the communicated second access code with an original access code, which original access code is stored in the electronic door lock, and in the case of agreement, the transmitter/receiver unit releases the electronic door lock and thus releases the door.

14. The method according to claim 13, wherein in said step e), the transmitter/receiver unit checks the communicated second access code with the list of locked access codes, and in the case of agreement, the transmitter/receiver unit releases the electronic door lock and thus releases the door.

15. The method according to claim 14, wherein the user can now enter a room through the released door

16. The method according to claim 14, wherein in said step e) apart from the communication of the second access code, also further data is communicated including at least one of a personal identification code, an instant of entry to the room, or an instant of departure from the room

17. The method according to claim 14, wherein the transmitter/receiver unit stores in a memory over a predetermined period of time all data which was communicated by the mobile communications unit.

18. The method according to claim 17, wherein the transmitter/receiver unit transmits stored access data as a packet to the mobile communications unit which temporarily stores the access data.

19. The method according to claim 1, wherein in said step b), additional communication parameters are transferred to the mobile communications unit, in said step e), the mobile communications unit can produce a communications connection with the additional communication parameters by a local mobile radio operator to the computer unit, so that the data transferred by the transmitter/receiver unit to the mobile communications unit can be passed on directly to the computer unit.

20. The method according to claim 1, wherein the data are communicated by at least one of the mobile communications unit, the first elevator terminal and the transmitter/receiver unit to the computer unit only at specific points in time or within a specific time period.

21. The method according to claim 1, wherein the data are communicated by the computer to at least one of the mobile communications unit, the first elevator terminal and the transmitter/receiver unit only at specific points in time or within a specific time period.

22. The method according to claim 1, wherein the data are selected by operation of the mobile communications unit.

23. The method according to claim 1, wherein the mobile communications unit is one of a mobile telephone, a PDA or a watch.

24. The method according to claim 1, wherein the first elevator terminal continuously emits a contact signal within the distance, and as soon as the user with the mobile communications unit is located within the distance from the first elevator terminal and receives the contact signal, the contact between the mobile communications unit and the first elevator terminal is established.

25. The method according to claim 1, wherein the distance is less than 10 meters.

26. The method according to claim 1, wherein the transmitter/receiver unit continuously emits a contact signal within the distance, and as soon as the user with the mobile communications unit is located within the distance from the transmitter/receiver unit and receives the contact signal, the contact the mobile communications unit and the transmitter/receiver unit is established.

27. The method according to claim 26, wherein the distance is less than 2 meters.

28. The method according to claim 1, wherein data are exchanged in dependence on access authorization.

29. The method according to claim 1, wherein the environment is one of: a building, a factory area, a high-rise structure, a shopping center, a town district, a leisure park, a railway station, an airport, a swimming pool and a sports stadium.

30. A method for the exchange of data between a mobile communications unit carried by a user and at least one of an elevator terminal, a transmitter/receiver unit and a computer unit, wherein the elevator terminal, the transmitter/receiver unit and the computer unit are positioned at different locations in an environment, wherein the elevator terminal frees access to an elevator and the transmitter/receiver releases an electronic door lock of a door; wherein the method comprises the following steps:

a) establishing contact between the mobile communications unit and a first elevator terminal disposed in the vicinity of the elevator at a first floor when the first elevator terminal and the mobile communications unit are spaced from one another at a predetermined distance, wherein a near-field radio connection is generated within the distance;

b) exchange of data between the mobile communications unit and the first elevator terminal by the near-field radio connection, whereby a list with locked access codes stored in the first elevator terminal is transferred from the first elevator terminal to the mobile communications unit and is temporarily stored in the mobile communications unit;

c) communication of data from the first elevator terminal to the computer unit, which computer unit is connected with the first elevator terminal;

d) establishing contact between the mobile communications unit and the transmitter/receiver unit when the transmitter/receiver unit and the mobile communications unit are spaced from one another at the distance, wherein a near-field radio connection is generated within the distance;

e) exchange of data between the mobile communications unit and the transmitter/receiver unit by the near-field radio connection, whereby the list with locked access codes temporarily stored in the mobile communications unit is transferred by the mobile communications unit to the transmitter/receiver unit and stored in the electronic door lock;

f) wherein a localization code describing the location of said elevator terminal is communicated by said elevator terminal to the mobile communications unit in said step b);

g) wherein after receipt of the localization code in said step b), the mobile communications device automatically checks whether it can assign to the localization code a corresponding code stored in a memory of the mobile communications unit, and if the check is successful, a first access code is transmitted by the mobile communications unit to the first elevator terminal, and if the check is unsuccessful, the first access code is not transmitted; and h) wherein the first elevator terminal thereupon checks whether the access code transmitted by the mobile communications unit agrees with an original access code stored in the first elevator terminal or in the computer unit, and in the case of agreement, the first elevator terminal frees access to the elevator.

31. A method for the exchange of data between a mobile communications unit carried by a user and at least one of an elevator terminal, a transmitter/receiver unit and a computer unit, wherein the elevator terminal, the transmitter/receiver unit and the computer unit are positioned at different locations in an environment, wherein the elevator terminal frees access to an elevator and the transmitter/receiver releases an electronic door lock of a door; wherein the method comprises the following steps:

a) establishing contact between the mobile communications unit and a first elevator terminal disposed in the vicinity of the elevator at a first floor when the first elevator terminal and the mobile communications unit are spaced from one another at a predetermined distance, wherein a near-field radio connection is generated within the distance;

b) exchange of data between the mobile communications unit and the first elevator terminal by the near-field radio connection, whereby a list with locked access codes stored in the first elevator terminal is transferred from the first elevator terminal to the mobile communications unit and is temporarily stored in the mobile communications unit;

c) communication of data from the first elevator terminal to the computer unit, which computer unit is connected with the first elevator terminal;

d) establishing contact between the mobile communications unit and the transmitter/receiver unit when the transmitter/receiver unit and the mobile communications unit are spaced from one another at the distance, wherein a near-field radio connection is generated within the distance;

e) exchange, of data between the mobile communications unit and the transmitter/receiver unit by the near-field radio connection, whereby the list with locked access codes temporarily stored in the mobile communications unit is transferred by the mobile communications unit to the transmitter/receiver unit and stored in the electronic door lock;

f) wherein a localization code describing a location of the first elevator terminal is communicated by the first elevator terminal to the mobile communications unit in said step b);

g) wherein after receipt of the localization code in said step b), the mobile communications device automatically checks whether it can assign to the localization code a corresponding code stored in a memory of the mobile communications unit, and if the check is successful, a first access code is transmitted by the mobile communications unit to the first elevator terminal, and if the check is unsuccessful, the first access code is not transmitted; and h) wherein the first elevator terminal thereupon checks whether the access code transmitted by the mobile communications unit agrees with an original access code stored in the first elevator terminal or in the computer unit, and in the case of agreement, the first elevator terminal transmits the list with locked access codes for temporary storage to the mobile communications unit.

* * * * *